United States Patent [19]
Palmer

[11] 3,934,263
[45] Jan. 20, 1976

[54] VIDEO DISC RECORDING APPARATUS AND METHODS

[75] Inventor: Richard Claxton Palmer, Blawenburg, N.J.

[73] Assignee: RCA Corporation, New York, N.Y.

[22] Filed: Nov. 12, 1974

[21] Appl. No.: 522,812

[52] U.S. Cl.................................. 358/4; 178/6.7 A
[51] Int. Cl.² ...................... H04N 5/84; H04N 9/38
[58] Field of Search........ 178/5.6, 5.8 R, 7.1, 6.7 A, 178/DIG. 23; 358/4; 360/33

[56] References Cited
UNITED STATES PATENTS

| | | | |
|---|---|---|---|
| 2,858,369 | 10/1958 | Kahn................................ | 178/5.8 R |
| 3,659,041 | 4/1972 | Kitaoka......................... | 178/DIG. 23 |
| 3,775,554 | 11/1973 | Hjortzberg.............................. | 358/1 |
| 3,849,776 | 11/1974 | Swynford-Lain...................... | 360/33 |

*Primary Examiner*—Howard W. Britton
*Attorney, Agent, or Firm*—Eugene M. Whitacre; William H. Meagher

[57] ABSTRACT

Frequency modulated sound carrier waves and frequency modulated picture carrier waves are combined in an adder, and the sum is clipped to develop a recording signal input for an electron beam disc recorder. To reduce possible sound carrier interference in pictures reproduced from signals recovered during disc playback, sound carrier waves, in quadrature phase relation to those applied to the adder, are combined with composite video signals to form the modulating signal input to the picture carrier frequency modulator.

12 Claims, 3 Drawing Figures

VIDEO DISC RECORDING APPARATUS AND METHODS

This invention relates generally to novel recording apparatus and recording methods for use in the disc recording of related picture and sound information, and particularly to novel recording apparatus and methods employing video signal predistortion by sound-related information in recording signal preparation, in order to facilitate sound interference reduction in subsequent playback of replicas of the recorded disc.

In U.S. Pat. No. 3,842,194, issued on Oct. 15, 1974 to Jon K. Clemens, video disc playback systems of a variable capacitance form are disclosed. In an arrangement therein disclosed, an information track incorporates geometric variations in the bottom of a spiral groove in a disc, the surface of which comprises conductive material covered with a thin coating of dielectric material. Variations in the capacitance presented between a conductive electrode on a tracking stylus and the conductive material of the disc occur as the disc is rotated by a supporting turntable; the capacitance variations are sensed to recover the recorded information.

In one particularly successful format employed for the groove bottom information track in practice of the Clemens invention, depressed areas extending across the groove bottom alternate with non-depressed areas, with the frequency of alternation varying with the amplitude of video signals subject to recording. The form of the recorded signal is thus a carrier frequency modulated in accordance with video signals. In a preferred technique for recording the information on a pregrooved video disc master, an electron beam subject to intensity modulation in accordance with FM carrier signals, impinges upon electron beam sensitive material in the master disc groove bottom, so that subsequent development leaves the desired relief pattern in the groove bottom. Reference may be made to the copending application of Loren B. Johnston, Ser. No. 335,024, filed Feb. 23, 1973 and entitled "Electron Beam Recording In Thick Materials", for a description of advantageous recording techniques that may be employed in such relief pattern development.

In the copending application of Eugene O. Keizer, Ser. No. 441,069 filed on Feb. 11, 1974, now U.S. Pat. No. 3,911,476, recording techniques are disclosed for video discs of the aforementioned Clemens type whereby the recording of a composite color video signal with a sound accompaniment may be achieved advantageously. In disc recording apparatus as disclosed in the Keizer application, accompanying audio signals are caused to frequency modulate a low frequency sound carrier over a low frequency deviation range. The output of the sound carrier modulator is added to the output of a picture carrier modulator. In the picture carrier modulator, a composite color video signal (including luminance signals occupying a given band of frequencies, and chrominance signals appearing as sideband components of a modulated chrominance subcarrier interleaved with luminance signal components in an intermediate region of the given band) is caused to frequency modulate a high frequency picture carrier over a high frequency deviation range. The peak-to-peak amplitude of the sound modulator output is held at a level which is small relative to the peak-to-peak amplitude level of the picture modulator output. The resultant of combining the respective modulated carriers is applied to clipping means to develop an output which may be conveniently described as an impulse train having a repetition rate corresponding to the frequency of the frequency modulated picture carrier, and having a "duty cycle" which varies cyclically about a 0.5 value with the frequency of said cyclic variation of "duty cycle" corresponding to the frequency of the frequency modulated sound carrier.

The duty cycle modulated output of the clipping means is amplified and processed for application to suitable recording apparatus. Illustratively, the recording apparatus is of the SEM recorder type described in the aforementioned Clemens patent, with the intensity of the scanning electron beam controlled in response to the signal developed by the clipping means. As successive groove bottom regions of a grooved disc master, coated with a layer of electron beam sensitive material (forming a smoothly curved surface for the groove), pass through the electron beam path, the regions are exposed in a pattern determined by the intensity controlling signal such that, upon subsequent development, a pattern of geometry variations corresponding to the exposure pattern is established in the groove bottom of the disc master.

A stamper disc may be derived from the recording master, as by techniques described in the Clemens patent, and utilized, the conventional record stamping machinery, to produce a plurality of replica discs of thermoplastic material, each replica disc having a surface groove, in the bottom of which appears an information track comprising geometric variations in the pattern established in the groove bottom of the recording master. The grooved surface of each replica disc is then covered, as described, for example, in the Clemens patent, with a layer of conductive material and an outer coating of dielectric material overlying the conductive layer. The respective thicknesses are sufficiently small so that the conductive layer and overlying dielectric coating follow the contours of the groove and the groove bottom geometry variations therein.

Through application of the principles of the Keizer system to the recording process, as illustratively described above, the structure of each coated replica disc resulting therefrom is as follows: The groove bottom geometry variations comprise alternations between a first cross-sectional shape for the groove in which the coated groove bottom and adjacent coated groove walls define a continuous smooth curve, and a second cross-sectional shape in which the groove bottom is depressed relative to the groove bottom level associated with the first cross-sectional shape. The rate at which the alternations repeat along a given arcuate dimension of a groove convolution varies along the groove in accordance with the amplitude of a composite color video signal including components representative of the luminance and chrominance of the scanned image that has been subject to recording. The ratio of the longitudinal (along the groove) dimension of a depressed groove bottom region and the longitudinal dimension of an adjacent non-depressed groove bottom region varies along the groove in cyclical fashion about a value of unity. The rate at which the cyclic ratio variation repeats along a given arcuate dimension of a groove convolution varies in accordance with the amplitude of an audio signal representative of the recorded sound accompaniment for the recorded image-representative signals.

In a playback of a video disc replica embodying the aforementioned Keizer format, under certain circumstances, sound interference in the image reproduction may be encountered that results in an undesired pattern display of possible distraction to the viewer. Particular instances of such sound interference occurrence have been observed to be the result of the interaction of certain record structure and pickup stylus response problems, as explained below.

In the practical use of electron beam recording of a grooved master disc coated with electron beam sensitive material in the manner described in the aforementioned Johnston application, the focused electron beam cross-section may have a non-ideal, graded (e.g., bell-shaped) distribution of electrons, with the result that an ideal information track geometry of undisturbed groove bottom areas interleaved with straight-edged pits is difficult to attain. Instead, the pits tend to have curved edges, and erosion of the groove bottom areas between successive pits is encountered.

When the spacing between successive pits is sufficiently small, overlapping erosion effects produce a reduction in the height of the intervening groove bottom area, a result hereinafter referred to as "signal track drop". When signal track drop is encountered, its severity (dependent upon the closeness of spacing of successive pits) will vary directly with picture carrier frequency. Moreover, the signal track drop will vary in accordance with the low frequency sound carrier, when the duty cycle modulation approach described above is employed, since the duty cycle modulation alters the spacing between successive pits. The severity of the signal track drop will tend to increase in moving from the outermost convolution of the disc's spiral groove toward the innermost convolution, as diameter reduction results in closer spacing of successive signal elements representative of any particular instantaneous picture carrier frequency.

In playback of a video disc with groove regions exhibiting signal track drop, one of the results can be a variation in spacing between the stylus electrode bottom and the relatively non-depressed areas of the groove bottom passing beneath the stylus. The dielectric support portion of the stylus is desirably of considerably greater length (along the groove) than the conductive electrode portion. As a consequence, the location of the stylus electrode bottom (in a direction perpendicular to the plane of the record) is primarily determined by the height of the non-depressed groove bottom areas supporting the dielectric support portion. When signal track drop variations are encountered, differences in the height of the groove bottom beneath the respective stylus portions will result in the above-noted changes in the spacing between the stylus electrode bottom and the groove bottom.

One of the consequences of the above-noted spacing changes is that the signals recovered by sensing of the variations of the capacitance between the stylus electrode and the disc's conductive layer are subject to undesired amplitude modulation reflecting the signal track drop variations. However, the amplitude modulation effects are tolerable to a considerable degree without leading to troublesome sound interference with picture reproduction, because the player's picture FM demodulator, from which composite video signals are derived, is preceded by limiter circuitry which can effectively remove the spurious amplitude modulation of the recovered signals.

A more difficult problem is posed by the incidence of phase modulation of the recovered picture carrier signals in response to signal track drop variations. With phase modulation not subject to removal by the limiter circuitry, such spurious phase modulation reflecting the signal track drop variations can result in the player's picture FM demodulator developing a composite video signal including as an interfering component the low frequency FM sound carrier.

To appreciate one manner in which signal track drop variations can produce the aforementioned undesired phase modulation effects, it is necessary to consider the stylus structure and its electrical characteristics. In the previously mentioned Clemens patent, two alternative forms of stylus structure are disclosed: (1) a symmetrical structure, wherein the conductive stylus electrode is "sandwiched" between dielectric support material, which extends ahead of, and behind, the electrode in symmetrical fashion; and (2) an asymmetrical structure, wherein the stylus electrode comprises a conductive coating on the rear surface of a dielectric support.

The asymmetrical stylus form described above has proven to be generally desirable because of greater ease in stylus fabrication for such a form. However, the material to the rear of the electrode of such an asymmetrical stylus, when in a playback position in a rotating disc groove, consists of air, whereas the material in front of the electrode comprises the dielectric support material of the stylus. The support material typically has a dielectric constant appreciably different than the dielectric constant of air; when, for example, sapphire is employed as the stylus support material, its dielectric constant is approximately nine times as great as the dielectric constant of air.

Because of the noted dielectric constant difference, a given area of the disc groove's conductive layer at a given height and located just ahead of the electrode of the asymmetrical stylus will provide a greater contribution to the net electrode-to-disc capacitance than a comparable area of the disc's conductive layer at the same height located just behind the stylus electrode. When the stylus electrode bottom is quite close to the disc's conductive layer (as when the electrode is contacting a non-depressed area of the groove bottom) the aforesaid unequal forward and rearward contributions are dominated by a large contribution to the net electrode-disc capacitance determined by the conductive layer area directly beneath the stylus electrode. When the disc's conductive layer drops away from the stylus electrode bottom (as when the electrode is centered over a pit in the groove bottom), the directly-beneath area contribution drops away the most rapidly, and the relative significance of the forward contribution increases, with a consequent forward skewing of the stylus response.

In the absence of signal track drop variations, the above-noted forward skewing of stylus response attributable to stylus asymmetry is tolerable. While the center of a transition between maximum and minimum values for the electrode-disc capacitance will occur in advance of the centering of a pit edge beneath the stylus electrode, the degree of advance will be essentially constant. However, when signal track drop variations are present and cause variations in the spacing between the stylus electrode bottom and the groove bottom, the degree of advance will vary with such spacing variations. The timing of the capacitance transitions is thus affected by the signal track drop variations.

Those signal track drop variations that follow the duty cycle modulation at sound carrier frequencies therefore can introduce phase modulation of the picture carrier at the sound carrier frequencies, with the result of undesired sound interference in the reproduced picture.

In accordance with the principles of the present invention, a reduction of the undesired sound interference arising in the above-described manner may be achieved by deliberate introduction of a carefully selected amount of phase modulation of the picture carrier by the sound carrier information in the course of preparation of the recording signal. Illustratively, the introduction is effected by adding an attenuated version of the sound carrier information to the composite video signals to be recorded prior to the application of the composite video signals to the picture carrier frequency modulator. If the added sound carrier information is properly phased, an effective cancellation of at least a portion of the phase modulation introduced by signal track drop variations will be achieved when a replica disc undergoes playback by a stylus of the noted asymmetrical form.

The phasing of the sound interference signal developed in response to signal track drop variations, relative to the duty cycle modulation that introduces the signal track drop variations, is subject to reasonably accurate prediction; wherefore, proper phasing of the "bucking" signal to be added to the composite video signals can reasonably be attained. The magnitude of the sound interference signal developed in response to signal track drop variations is, on the other hand, less subject to reasonably accurate prediction, being dependent upon a complex of variables, including a variety of recording parameters, recorded signal content, groove convolution diameter, et al., as well as various playback parameters. Thus, a magnitude, or set of magnitudes, cannot readily be selected for the bucking signal that will ensure complete cancellation of the sound interference for all playback intervals under all possible circumstances.

Nevertheless, one may choose a magnitude, or set of magnitudes, below an appropriate level, for the bucking signal to be introduced, with the assurance that: (1) for a given range of interference levels, complete interference cancellation or a lessening of the interference below a visibility threshold will be achieved: (2) for interference levels above said given range, the bucking signal presence will lower the interference level toward the visibility threshold (whereby the interference is at least less severe, if no other interference reduction scheme is additionally employed; whereas, if an additional interference reduction scheme is employed, the requirements imposed thereon are lessened); (3) for interference levels below said given range, the excess bucking signal is not of such magnitude as to exceed said visibility threshold to constitute annoying interference itself.

In practice of the present invention, one may simply select a single magnitude setting for the bucking signal, and provide bucking signal addition at the selected level throughout the recording. Alternatively, the bucking signal magnitude may be programmed for level changes dependent upon the location of the groove convolution subject to recording beam exposure. For example, the bucking signal magnitude may be manually adjusted to successively higher levels as successive, more inwardly located, bands of groove convolutions are subject to recording beam exposure. For a second example, an automatic continuous adjustment of the bucking signal magnitude may be effected as the recording beam progresses toward the record center, through use of suitable time-responsive controls.

As explained in a copending application Ser. No. 522,811 of Jon K. Clemens and Richard C. Palmer, concurrently filed Nov. 12, 1974, it may be desirable that the picture information recorded on a video disc is accompanied by multiple channels of audio information (e.g., a stereo sound accompaniment; a bilingual sound track; etc.). In the recording approach proposed in said Clemens, et al. application, each of the individual audio signals effects frequency modulation of a respectively different low frequency carrier, and duty cycle modulation of the picture carrier is carried out in accordance with the sum of the respective frequency modulated sound carriers. In such use of a multichannel sound accompaniment, assurance of adequate sound performance from each channel is likely to require greater duty cycle modulation extremes than are adequate for single channel accommodation, wherefore the sound interference problem delineated above may be magnified. In application of the principles of the present invention to the recording of video discs with multichannel sound accompaniment, the appropriate bucking signal for addition to the composite video signals prior to frequency modulation of the picture carrier comprises the sum of appropriate amounts, each with appropriate phasing, of the respective FM sound carriers. As explained below, different magnitudes of the respective FM sound carriers may be appropriate for bucking signal use because of the difference in carrier frequency.

Objects and advantages of the present invention will be readily ascertained by those skilled in the art upon a reading of the following detailed description and an inspection of the accompanying drawings wherein.

Figure 1:
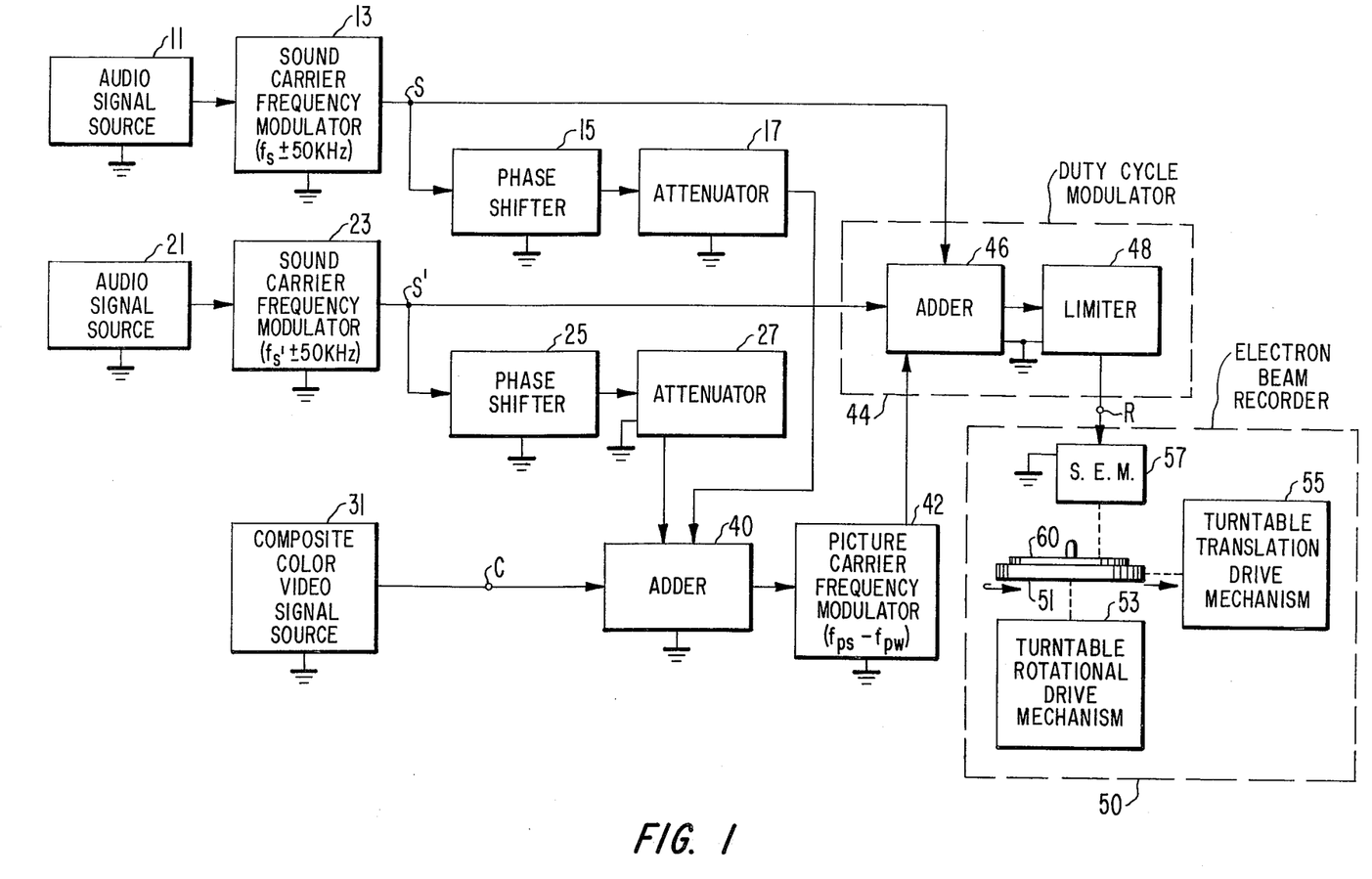
FIG. 1 illustrates, via a block diagram representation, recording apparatus embodying the principles of the present invention.

In the arrangement of FIG. 1, a pair of audio signal sources, 11 and 21, provide sound information appropriate for recording with the color picture information provided by a composite color video signal source 31. Illustratively, the sound information may comprise respective "left" and "right" channel information appropriate for stereo sound reproduction.

The output of audio signal source 11 is applied to a first sound carrier frequency modulator 13 to develop a first FM signal comprising carrier frequency waves varying in frequency about a center frequency $f_s$ in accordance with the amplitude of the source 11 output. The output of audio signal source 21 is applied to a second sound carrier frequency modulator 23 to develop a second FM signal comprising carrier frequency waves varying in frequency about a different center frequency $f_s'$ in accordance with the amplitude of the source 21 output. A third FM signal is developed by the picture carrier frequency modulator 42 in response to the output of an adder 40, which accepts as one of its inputs the signals developed by the composite color video signal source 31. The carrier frequency deviation range for modulator 42 extends between a minimum frequency $f_{ps}$ and a maximum frequency $f_{pw}$, with the output of source 31 (occupying a band of frequencies: $0-f_v$) poled so that transitions from black toward white cause an increase in the picture carrier frequency.

Figure 2:
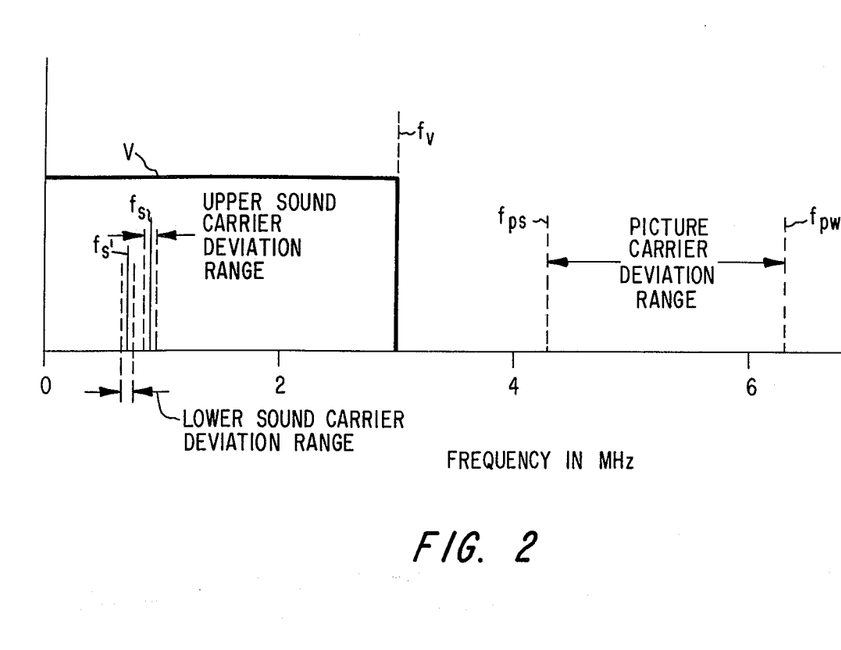
FIG. 2 illustrates graphically frequency spectrum locations that may be employed for various recording signal parameters in an illustrative use of the recording apparatus of FIG. 1.

Illustrative locations in the frequency spectrum for the respective deviation ranges of the three FM signals are shown in FIG. 2 in relation to the band of frequencies occupied by the composite color video signals provided by source 31 (as represented by the idealized low pass filter characteristic "$v$"). In FIG. 2, the output of modulator 13 is shown as occupying an upper sound carrier deviation range of $f_s \pm 50$ KHz., with an illustrative value of $f_s$ being approximately 905 KHz.; while the output of modulator 23 is shown as occupying a lower sound carrier deviation range of $f_s' \pm 50$ KHz, with an illustrative value of $f_s'$ being approximately 716 KHz. Both of the sound carrier deviation ranges fall within the video band, illustratively extending from 0–3 MHz. The illustrative picture carrier frequency deviation range occupies the band of frequencies between 4.3 and 6.3 MHz. A representative passband (not shown in FIG. 2) for the respective audio signals provided by sources 11 and 21 is 20,000–15,000 Hz.

Duty cycle modulation of the picture carrier wave output of modulator 42 is effected in accordance with the sum of the sound carrier wave outputs of modulators 13 and 23 by a duty cycle modulator 44, comprising an adder 46 for summing the three FM signals and a limiter 48 for double clipping the resultant sum.

The magnitudes of the sound modulator outputs supplied to adder 46 are chosen so that the peak-to-peak amplitude of their sum remains small relative to the peak-to-peak amplitude of the output of the picture carrier modulator 42, and double clipping levels in limiter 48 are set with a spacing appreciably smaller than the peak-to-peak swing of either sound modulator output. Illustratively, the peak-to-peak amplitude of each sound modulator output is set at a level 17 db. below the peak-to-peak amplitude of the output of the picture carrier frequency modulator 42. The maximum amplitude swing of the sum of the sound carrier modulator outputs is thereby limited to approximately two-sevenths (about 0.282) of the peak-to-peak swing of the picture carrier modulator output, with a consequent duty cycle variation range for the output of limiter 48 of approximately $0.5 \pm 0.09$ (in the instance of a sinusoidal waveshape for the output of the picture carrier modulator).

The output of the duty cycle modulator 48, appearing at the limiter output terminal R, serves as the recording signal input to an electron beam recorder 50 of the scanning electron microscope (SEM) type generally described in the above-mentioned Clemens patent. In the electron beam recorder, a scanning electron microscope 57 directs a beam of electrons upon a resist-coated, curved groove bottom of a pre-grooved recording master disc 60. The disc 60 is supported by a turntable 51 which is subject to (a) rotational motion imparted by a turntable rotational drive mechanism 53, and (b) translational motion imparted by a turntable translational drive mechanism 55. The rotational and translational drives are interrelated in such manner that the electron beam path is intercepted by successive regions along the length of the disc's spiral groove. Reference may be made to the copending application of Robert W. Jebens, et al. Ser. No,. 349,775, filed on Apr. 10, 1973 and entitled "Precision Turntable Rotation In A Vacuum Atmosphere", for a more detailed explanation of suitable apparatus for effecting the requisite controlled motion of the turntable 51.

Illustratively, the SEM electron beam is unblanked for the duration of each positive swing of the clipped signal at terminal R, and blanked for the duration of each negative swing of the clipped signal. The sweep rate for the SEM beam is considerably higher than the highest frequency of the picture carrier deviation range, while the beam sweep amplitude and unblanked beam intensity are substantially constant. As the disc rotates at a constant speed, a pattern of successive exposed and unexposed regions is produced along the length of the groove, with the lengths thereof (along the groove) determined by the respective swing durations of the recording signal input. Assuming, for example, that the master disc groove coating is a positive resist, a subsequent development step will leave a pattern of alternating depressed and (relatively) non-depressed regions in the groove bottom corresponding to the pattern of exposed and unexposed regions, respectively.

However, where the practical problems of non-ideal beam cross-section, overlapping of exposures, erosion, etc. described previously are encountered in use of the recorder 50, the exposed and developed disc 60 may suffer from the previously discussed problem of signal track drop variations, and the playback of a suitably coated replica of the recorded disc with an asymmetrical stylus may lead to the sound interference problem previously outlined. The recording apparatus of FIG. 1 accordingly includes additional elements for sound interference reduction purposes pursuant to the principles of the present invention.

In particular, the additional elements comprise means for developing respective versions, of appropriate phase and magnitude, of the respective modulated sound carriers for addition to the composite color video signal input to the picture carrier frequency modulator 42. The modulated sound carrier waves appearing at the output terminal S of modulator 13 are applied via a path comprising a phase shifter 15 and an attenuator 17 to the adder 40 to provide an additional input thereto. The modulated sound carrier waves appearing at the output terminal S' of modulator 23 are applied via a path comprising a phase shifter 25 and an attenuator 27 to the adder 40 to provide a further input thereto.

The presence of the respective sound carrier components in the adder output results in an intentional sound carrier-responsive frequency modulation of the picture carrier waves developed by modulator 42. Desirably this intentional modulation is carried out with such phasing that upon replica playback, the picture carrier Fm demodulator of the disc player will respond to the intentional modulation by development of sound carrier components in anti-phasal relation to the sound carrier component development engendered in response to signal track drop variations. It has been determined that such a cancelling effect may be realized by establishing a quadrature phase relationship between the sound carrier components effecting frequency modulation of the picture carrier wave output of modulator 42, and the sound carrier components added to said output in adder 46. The sense of the quadrature shift (for the illustrative SEM recorder operating conditions) should be such that the bucking signal component (applied to modulator 42) peaks in the picture carrier frequency reducing direction 90° in advance of the peaking of the related sound carrier component (applied to adder 46) in that direction which results in an increase in the SEM "beam-on" duty cycle.

In an illustrative apparatus arrangement, negative-going swings of an input to adder 40 result in down-shifting of the picture carrier frequency, while positive-going swings of a sound carrier input to adder 46 result in an increase in the SEM beam-on duty cycle. With such an apparatus arrangement, the desired function for each of the phase shifters 15 and 25 may be satisfied by apparatus introducing a 90° phase lag. In a simple form of realization, phase shifter 15 comprises a delay line providing a delay corresponding to a quarter-cycle at the sound carrier frequency $f_s$ (e.g., at approximately 905 KHz.), while phase shifter 25 comprises a delay line providing a delay corresponding to a quarter-cycle at the sound carrier frequency $f_s$, (e.g., at approximately 716 KHz.).

It should be noted that when the phase shifter functions are performed by delay lines as described above, the precisely correct phasing for cancellation purposes is achieved only when the instantaneous sound carrier frequency corresponds to the center frequency for which the delay was chosen. As each sound carrier deviates about the center frequency, a misphasing of the bucking signal will be encountered. However, for the illustrative recording parameters, where the deviation range width (100 KHz.) is a relatively small percentage of the respective center frequencies, the misphasing will be relatively small (e.g. 6.3° or less) and can be reasonably tolerated.

The attenuators 17 and 27 serve to adjust the magnitudes of the respective bucking signal components to appropriate levels (typically lower than the sound carrier levels supplied to adder 46). In the simplest form of use of the present invention, a fixed attenuation setting or each of the attenuators 17 and 27 is held throughout the recording time, resulting in a constant level or bucking signal introduction for all recorded groove convolutions.

It may be desired, as previously discussed, to hold the bucking signal to a level sufficiently reduced as to ensure that presence of the bucking signal components alone in the output of the player's picture carrier FM demodulator will not result in a visible interference pattern. Illustrative choices for the attenuator settings for such a purpose are: (a) a setting for attenuator 17 which reduces the higher ($f_s$) sound carrier bucking signal component to a level 37 db below the maximum (sync tip to peak white) amplitude permitted for the composite color video signals supplied by source 31; and (b) a setting for attenuator 17 which reduces the lower ($f_s'$) sound carrier bucking signal component to a level 39 db below the video maximum amplitude. The higher level setting for the $f_s$ component is tolerable because of the effects of de-emphasis circuitry in the disc player's circuitry for processing the video signal output of the picture carrier FM demodulator. Illustratively, the player's de-emphasis characteristic is complementary to a luminance signal pre-emphasis characteristic employed in the development of the composite color-video signals and having a response level rise with frequency of 6 db per octave commencing at 300 KHz.

Higher levels of bucking signal magnitude than those given in the example above may often be desired to obtain a greater degree of the interference cancellation effect. Also, as previously noted, signal track drop variations will tend to increase in severity with decrease in groove convolution diameter, wherefore a programmed increase in bucking signal magnitude as the recording process proceeds from outermost groove convolution toward innermost groove convolution may be desirable. An illustrative schedule of bucking signal component magnitudes (relative to sync-to-white video signal magnitude) that has been advantageously employed through manual adjustment of the recording apparatus of FIG. 1 is the following: (1) for an outer band of groove convolutions (5.7 – 5.0 inches spacing from disc center), −32 db for the $f_s$ component, and −34 db for the lower frequency $f_s'$ component; (2) for a central band of groove convolutions (5.0 – 4.0 inches spacing from disc center), −30 db for the $f_s$ component, and −32 db for the $f_s'$ component; and (3) for an inner band of groove convolutions (4.0 – 3.3 inches spacing from disc center), −28 db for the $f_s$ component, and −30 db for the $f_s'$ component.

Figure 3:
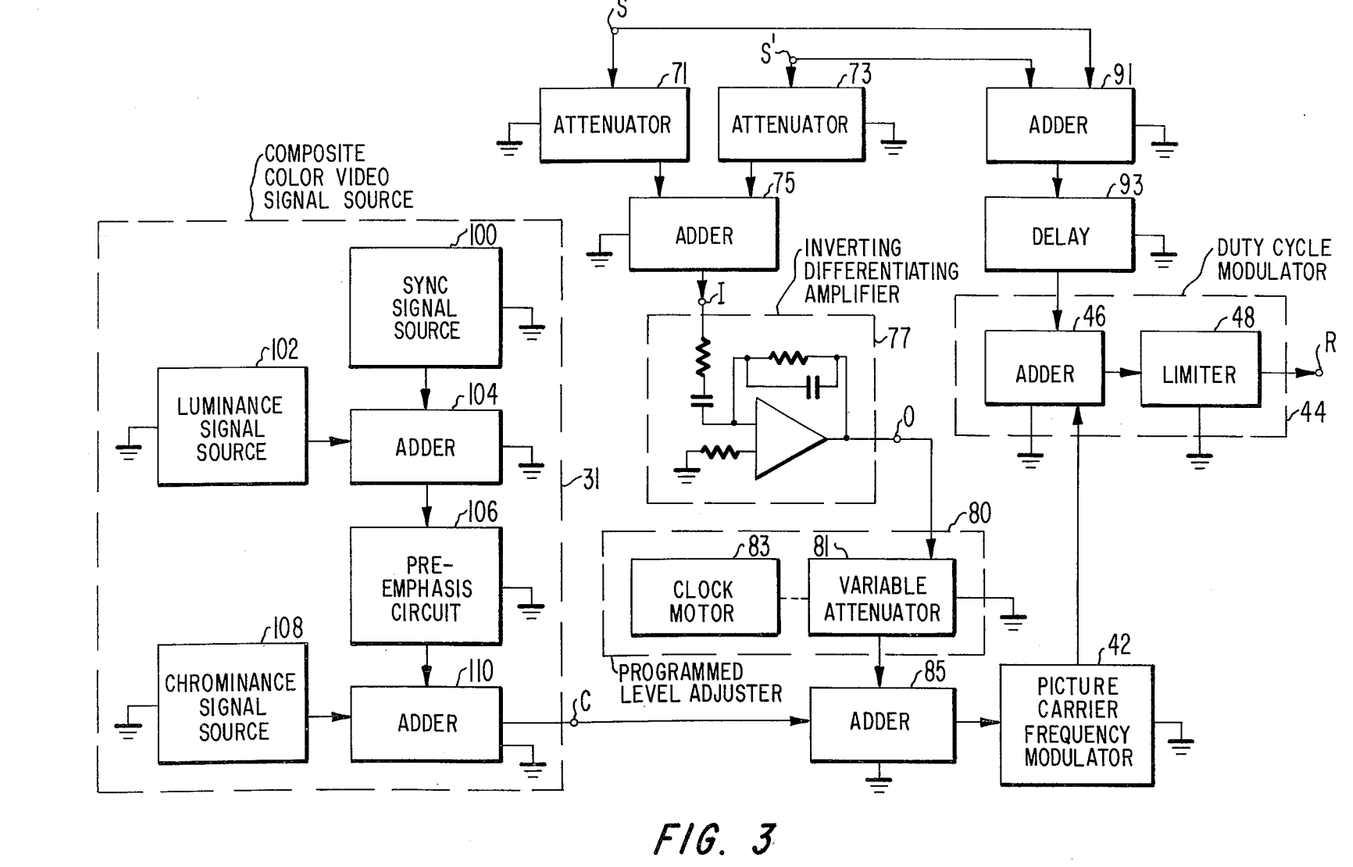
FIG. 3 illustrates a modification of a portion of the recording apparatus of FIG. 1 pursuant to a further embodiment of the present invention.

In FIG. 3, a modification of a portion of the recording apparatus of FIG. 1, pursuant to a further embodiment of the present invention, is shown. In the modified structure, the respective sound carrier signals appearing at terminals S and S' (the output terminals of the sound carrier frequency modulators 13 and 23 of FIG. 1 arrangement) are applied to respective attenuators 71 and 73, the outputs of which are summed in an adder 75.

A combination of the respective bucking signal components (with respectively different levels appropriate to the difference in their spectrum locations, as determined by the attenuation settings of attenuators 71–73) is supplied by adder 75 to input terminal I of an inverting differentiating amplifier 77, the latter functioning to provide an effective 90° phase lag for bucking signal components, whether at the respective center frequencies or deviated therefrom. An illustrative circuit arrangement for amplifier 77 is schematically represented in FIG. 3, such circuit arrangement readily permitting, with appropriate circuit parameter choices, achievement of the desired phase shift over a range of frequencies encompassing the deviation ranges for both sound carriers.

The phase shifted bucking signal appearing at the output terminal 0 of amplifier 77 is applied to a programmed level adjuster 80, which functions to automatically and continuously adjust the bucking signal magnitude as the recording process proceeds from outermost groove convolution to innermost groove convolution (in lieu of the manual, step-wise adjustment discussed in connection with FIG. 1). An illustrative form of realization for the programmed adjuster 80 is shown as comprising a variable attenuator 81 driven by a clock motor 83, so that bucking signal magnitude may be adjusted upwardly with elapsed recording time. The output of the variable attenuator 81 is supplied to adder 85 for combination with the composite color video signals appearing at output terminal C of the composite color video signal source 31.

An illustrative arrangement of elements for the source 31 is shown in FIG. 3. The outputs of respective sync signal and luminance signal source 100 and 102 are combined in an adder 104 and applied to a pre-emphasis circuit 106, illustratively providing the high frequency pre-emphasis previously discussed in connection with FIG. 1. The pre-emphasized signal output of circuit 106 is combined in an adder 110 with the output of a chrominance signal source 108, with the output of adder 110 forming the composite color video signals delivered to terminal C. Illustratively, the chrominance signals provided by source 108 are of the buried subcarrier type disclosed in the copending application of Dalton H. Pritchard, Ser. No. 350,777, filed on Apr. 13, 1973 and entitled "Color Information Translating Systems", now U.S. Pat. No. 3,872.498.

The output of adder 85 provides the modulating signal input for the picture carrier frequency modulator 42. As in FIG. 1, the output of modulator 42 is applied to the adder 46 portion of duty cycle modulator 44 for combination with the respective sound carrier waves. However, in contrast with the FIG. 1 arrangement, the sound carrier wave application path includes an adder 91 forming a sum of the respective signals for modulator output terminals S and S', and a delay device 93 imparting a selected amount of delay to the sum of the sound carrier waves prior to application to the adder 46. The presence of delay device 93 permits compensation for delay suffered by the bucking signal components subsequent to amplifier 77, whereby the desired quadrature phase relationship established by the operation of amplifier 77 may be maintained. The output of duty cycle modulator 44 appears at terminal R for recording signal use in the manner shown in FIG. 1.

It should be noted that the illustrative frequency values presented in FIG. 2 are appropriate for use in the recording system of FIG. 1 (or 3) when the electron beam recorder 50 operates in a "real time" mode. However, where limits of attainable resist sensitivity and electron beam intensity, for example, require SEM recorder operation in a "slower than real time" mode, the frequency values given should be divided by the time expansion factor employed. Thus, for example, where the slow down mode involves rotation of the master recording disc at 1/20th the intended rotational speed for replica disc playback, the illustrative frequency values are to be divided by 20.

While the illustrative embodiments of the invention shown in FIGS. 1 and 3 have been specifically directed to video disc recording systems employing multiple sound channels, it will be readily appreciated that the delineated bucking signal approach may also be advantageously employed where only a single sound channel is recorded. It may also be noted that, whereas a specific cause (associated with signal track drop variations, et al.) has been identified herein with undesired phase modulation of the recovered picture-carrier waves, there may arise other recording or playback conditions leading to undesired phase modulation of the recovered picture carrier waves for which the bucking signal approach of the present invention may provide an interference reduction aid.

What is claimed is:

1. In a video disc recording system, the combination comprising:
    a source of composite video signals;
    a source of audio signals;
    means for modulating the frequency of a first carrier over a predetermined low frequency deviation range in accordance with the amplitude of audio signals from said audio signal source;
    means for adding a frequency modulated carrier wave output of said first carrier modulating means to composite video signals from said composite video signal source;
    means for modulating the frequency of a second carrier over a predetermined high frequency deviation range in accordance with the amplitude of the output of said adding means;
    means for linearly combining a frequency modulated carrier wave output of said first carrier modulating means with a frequency modulated carrier wave output of said second carrier modulating means to form a combination signal;
    clipping means responsive to said combination signal formed by said combining means for developing a clipped signal output; and
    disc recording means for utilizing said clipped signal output of said clipping means as a recording signal.

2. Apparatus in accordance with claim 1 wherein the frequency modulated carrier wave output of said first carrier modulating means is supplied to said combining means with a peak-to-peak amplitude which is small relative to the peak-to-peak amplitude of the frequency modulated carrier wave output of said second carrier modulating means which is supplied to said combining means; and
    wherein the frequency modulated carrier wave output of said first carrier modulating means is supplied to said adding means with a peak-to-peak amplitude which is small relative to the maximum amplitude swing of the composite video signals provided by said composite video signal source.

3. Apparatus in accordance with claim 1 including means for establishing a substantially quadrature phase relationship between the carrier wave output of said first carrier modulating means which is added to said composite video signals and the carrier wave output of said first carrier modulating means which is supplied to said combining means.

4. In a recording system for color picture/sound records, the method of developing a recording signal which comprises the steps of:
    a. developing (1) a composite color video signal representative of color images to be recorded, and (2) an audio signal representative of a sound accompaniment for the color images to be recorded;
    b. modulating the frequency of a first carrier over a relatively low frequency deviation range in accordance with said audio signal, while modulating the frequency of a second carrier over a relatively high frequency deviation range in accordance with the sum of said composite color video signal and said first frequency modulated carrier;
    c. combining the first frequency modulated carrier with the second frequency modulated carrier to form a combination signal; and
    d. limiting said combination signal to form a recording signal.

5. In a video disc recording system, the combination comprising:
    a source of composite video signals;
    a first source of audio signals;
    means for modulating the frequency of a first carrier over a first low frequency deviation range in accordance with the amplitude of audio signals from said first audio signal source;
    a second source of audio signals;
    means for modulating the frequency of a second carrier over a second low-frequency deviation range in accordance with the amplitude of audio signals from said second audio signal source;

means for adding a frequency modulated carrier wave output of said first carrier modulating means and a frequency modulated carrier wave output of said second carrier modulating means to composite video signals from said composite video signal source;

means for modulating the frequency of a third carrier over a predetermined high frequency deviation range in accordance with the amplitude of the output of said adding means;

means for linearly combining a frequency modulated carrier wave output of said first carrier modulating means and a frequency modulated carrier wave output of said second carrier modulating means with a frequency modulated carrier wave output of said third carrier modulating means to form a combination signal; and a limiter responsive to said combination signal formed by said combining means for developing a recording signal output.

6. Apparatus in accordance with claim 5 wherein the respective outputs of said first and second carrier modulating means which are supplied to said combining means each have a peak-to-peak amplitude which is small relative to the peak-to-peak amplitude of the frequency modulated carrier wave output of said third carrier modulating means which is supplied to said combining means; and wherein the respective outputs of said first and second carrier modulating means which are supplied to said adding means each have a peak-to-peak amplitude which is small relative to the maximum amplitude swing of the composite video signals provided by said composite video signals source.

7. In a recording system for a color picture/stereo sound record, the method of developing a recording signal which comprises the steps of:
 a. developing (1) a composite color video signal representative of color images to be recorded, and (2) a pair of audio signals representative of a stereo sound accompaniment for the color images to be recorded;
 b. modulating the frequency of a first carrier over a first, relatively low frequency, deviation range in accordance with one of said pair of audio signals, while modulating the frequency of a second carrier over a second, relatively low frequency, deviation range in accordance with the other of said pair of audio signals;
 c. modulating the frequency of a third carrier over a third, relatively high frequency, deviation range in accordance with the sum of said composite color video signal and said first and second frequency modulated carriers;
 d. combining the first and second frequency modulated carriers with the third frequency modulated carrier to form a combination signal; and
 e. limiting said combination signal to form a recording signal.

8. In a video disc recording system, the combination comprising:
 a source of composite color video signals;
 an audio signal source having first and second stereo signal component outputs;
 means for modulating the frequency of a first carrier over a first low frequency deviation range in accordance with the amplitude of said first stereo signal component output of said audio signal source;
 means for modulating the frequency of a second carrier over a second low frequency deviation range, higher than said first low frequency deviation range, in accordance with the amplitude of said second stereo signal component output of said audio signal source;
 means for adding a frequency modulated carrier wave output of said first carrier modulating means and a frequency modulated carrier wave output of said second carrier modulating means to composite color video signals from said composite color video signal source;
 means for modulating the frequency of a third carrier over a predetermined high frequency deviation range in accordance with the amplitude of the output of said adding means;
 means for linearly combining a frequency modulated carrier wave output of said first carrier modulating means and a frequency modulated carrier wave output of said second carrier modulating means with a frequency modulated carrier wave output of said third carrier modulating means to form a combination signal; and
 a limiter responsive to said combination signal formed by said combining means for developing a recording signal output.

9. Apparatus in accordance with claim 8 wherein the respective outputs of said first and second carrier modulating means which are supplied to said combining means each have the same peak-to-peak amplitude which is small relative to the peak-to-peak amplitude of the frequency modulated carrier wave output of said third carrier modulating means which is supplied to said combining means;
 wherein the output of said first carrier modulating means which is supplied to said adding means has a peak-to-peak amplitude which is greater than the peak-to-peak amplitude of the output of said second carrier modulating means which is supplied to said adding means; and
 wherein the respectively different peak-to-peak amplitudes of the respective outputs of said first and second carrier modulating means which are supplied to said adding means are each small relative to the maximum amplitude swing of the composite color video signals provided by said composite color video signal source.

10. Apparatus in accordance with claim 9 also including:
 means for establishing a substantially quadrature phase relationship between the carrier wave output of said first carrier modulating means which is added to said composite color video signals and the carrier wave output of said first carrier modulating means which is supplied to said combining means; and
 means for establishing a substantially quadrature phase relationship between the carrier wave output of said second carrier modulating means which is added to said composite color video signals and the carrier wave output of said second carrier modulating means which is supplied to said combining means.

11. Apparatus in accordance wih claim 9 also including:

means for commonly varying in accordance with elapsed recording time, the respectively different peak-to-peak amplitudes of the respective outputs of said first and second carrier modulating means which are supplied to said adding means.

12. The combination in accordance with claim 9 wherein respective outputs of said first and second carrier modulating means are supplied to said adding means by apparatus comprising:

means for summing outputs of said first and second carrier modulating means;

an inverting differentiating amplifier responsive to the output of said summing means;

variable attenuator means responsive to the output of said amplifier; and means for applying the output of said variable attenuator means to said adding means.

* * * * *